UNITED STATES PATENT OFFICE.

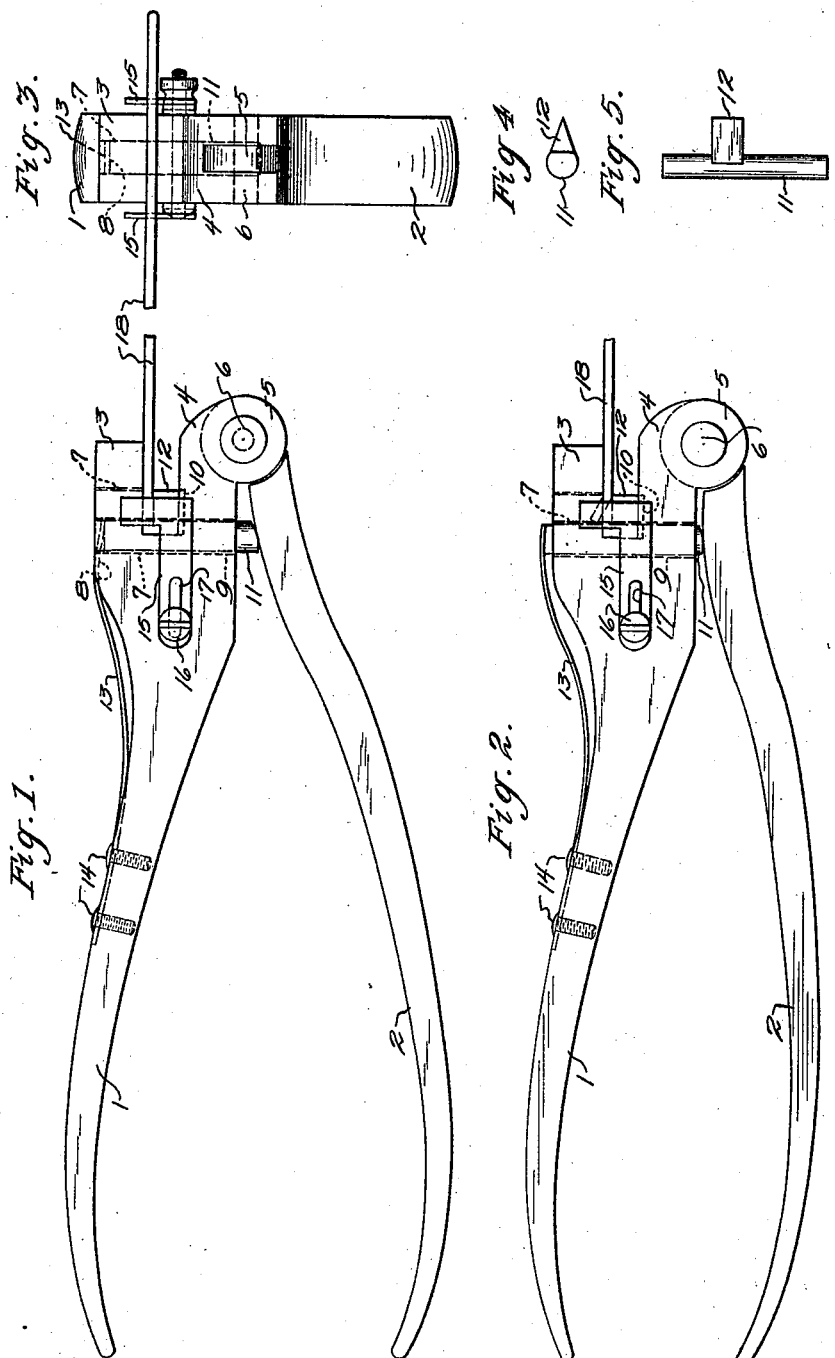

JOHN JOHNSON, OF DES MOINES, IOWA.

SAW-TOOTH CUTTER.

1,383,722.  Specification of Letters Patent.  Patented July 5, 1921.

Application filed February 24, 1920. Serial No. 360,821.

*To all whom it may concern:*

Be it known that I, JOHN JOHNSON, a citizen of Sweden, residing at Des Moines, in the county of Polk and State of Iowa, have invented certain new and useful Improvements in Saw-Tooth Cutters, of which the following is a specification.

This invention relates to improvements in saw tooth cutters. The prime object of the invention is to provide simple means for cutting or forming teeth upon a saw blade. With the foregoing and other objects in view the invention consists in the combination and arrangement of parts to be hereinafter fully described, pointed out in the appended claims and illustrated in the accompanying drawing which forms a part of this specification and in which—

Figure 1 is a view of my improved saw tooth cutter in side elevation illustrating its application.

Fig. 2 is a view similar to Fig. 1 but with the movable parts in an altered position.

Fig. 3 is a front view of Fig. 1.

Fig. 4 is a plan view of the plunger employed.

Fig. 5 is a view of Fig. 4 in elevation.

Like reference characters denote corresponding parts throughout the several views.

My saw tooth cutter comprises the handles 1, 2, the handle 1 being bifurcated at its forward end to form the prongs 3, 4, the prong 4 being formed with the downturned lip or extension 5 which is bifurcated to receive the diminished end of the handle 2 to which said lip is pivotally connected by the pin 6. The prong 3 of handle 1 is formed with the wedge or V-shaped perforation 7 and with a groove 8 communicating therewith. The prong 4 is formed with a substantially circular perforation 9, in alinement with the perforation 7 of prong 3, and with a V-shaped groove or recess 10 communicating therewith. A plunger 11 approximately circular in cross section and provided with a V-shaped lug or cutter 12 is disposed in the perforated portions 7, 9 of the prongs 3, 4, the V-shaped lug 12 being disposed in the perforation 7 and adapted to seat in the recess 10, one end of said plunger 11 having a bearing upon the handle 2. A leaf spring 13 secured by screws 14 to the handle 1 bears upon the opposite end of the plunger 11 to retain the same in the perforations 7, 9 of the prongs 3, 4 and in engagement with the handle 2.

To the sides of the bifurcated ends of the handle 1 the guide ears 15 are adjustably secured by means of the screws 16 which extend through the elongated slots 17, formed in said ears, and into the said handle. The spring 13 exerting a pressure upon the plunger 11 yieldingly retains the non-pivoted ends of the handles 1, 2 the maximum distance apart and keeps the lug or cutter 12 of plunger 11 spaced away from the prong 3 of handle 1.

Should the teeth of the saw blade 18 be uneven or should it be desired to change the saw from a fine tooth to a coarse tooth saw or vice versa, the first operation is to file off the saw teeth in any suitable manner and then use my saw tooth cutter to produce new teeth of any length or degree of fineness desired. When the teeth have been filed down, the cutting edge of the blade is inserted between the prongs 3, 4 with a portion projecting into the path of movement of the cutter 12, the ears 15 serving to regulate the depth of saw-blade-projection into the path of said cutter. The handles 1, 2 are now brought forcibly together causing the cutter to punch out a portion of the blade edge; the saw blade is then moved laterally the width of one tooth and the operation repeated and in this way the saw teeth are successively formed. As shown in Figs. 1 and 2 the saw blade is impinged between the cutter 12 and prong 3. If desired the tool may be turned over and the teeth will then be formed in the same manner except that the blade when first placed in position will rest upon the prong 3 instead of upon the cutter 12.

What is claimed is:—

1. In a saw tooth cutter, a handle having one bifurcated termination, the prongs of said termination being perforated in alinement with each other, one of said prongs being formed with an integral downturned lip, a second handle pivotally connected to said lip, a plunger connecting the perforated portions of said prongs, a cutter carried by said plunger and adapted to move, with said plunger, into and out of the perforation formed in one of said prongs, said plunger having a bearing upon the said second handle, and means carried by said first named handle for retaining said plunger in position.

2. In a saw tooth cutter, a handle having one bifurcated termination, the prongs of said termination being perforated in alinement with each other, one of said prongs being formed with an integral downturned lip, a second handle pivotally connected to said lip, a plunger connecting the perforated portions of said prongs, a cutter carried by said plunger and adapted to move into and out of the perforation formed in one of said prongs, said plunger having a bearing upon the said second handle, means carried by said first named handle for retaining said plunger in position, and guide ears carried by said first named handle and adapted for engagement with the saw blade to regulate the position of the same relative to the cutter.

3. In a saw tooth cutter, a handle having one bifurcated termination, the prongs of said termination being perforated in alinement with each other, one of said perforations being V-shaped, one of said prongs being formed with a downturned lip, a second handle pivotally connected to said lip, a plunger connecting the perforated portions of said prongs, a cutter carried by said plunger and adapted to move into and out of said V-shaped perforation, said plunger having a bearing upon the said second handle, and a spring carried by said first named handle and having a bearing upon the said plunger.

In testimony that I claim the foregoing as my own I have hereto affixed my signature in the presence of two subscribing witnesses.

JOHN JOHNSON.

Witnesses:
C. B. PAULSON,
OTIS SKOGSTAD.